(12) United States Patent
Akutagawa

(10) Patent No.: US 7,210,367 B2
(45) Date of Patent: May 1, 2007

(54) TWIN-CLUTCH TRANSMISSION

(75) Inventor: Hitoshi Akutagawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 156 days.

(21) Appl. No.: 11/011,053

(22) Filed: Dec. 15, 2004

(65) Prior Publication Data

US 2006/0123939 A1    Jun. 15, 2006

(30) Foreign Application Priority Data

Feb. 20, 2004  (JP) ............................. 2004-044410
Mar. 1, 2004  (JP) ............................. 2004-055929

(51) Int. Cl.
F16H 3/38   (2006.01)
F16H 3/08   (2006.01)

(52) U.S. Cl. .......................................... 74/340; 74/331

(58) Field of Classification Search .................. 74/329, 74/330, 331, 340
See application file for complete search history.

(56) References Cited

U.S. PATENT DOCUMENTS

| | | | |
|---|---|---|---|
| 2,205,832 A * | 6/1940 | Edouard | ....................... 74/337 |
| 2,386,541 A | 10/1945 | Campodonico | |
| 4,463,621 A | 8/1984 | Fisher | |
| 4,627,301 A * | 12/1986 | Bainbridge et al. | ........... 74/333 |
| 6,209,406 B1* | 4/2001 | Sperber et al. | ............... 74/330 |
| 6,460,425 B1 | 10/2002 | Bowen | |
| 6,490,944 B1 | 12/2002 | Heinzel et al. | |
| 6,595,077 B1* | 7/2003 | Geiberger et al. | ............ 74/330 |
| 2002/0088289 A1 | 7/2002 | Bowen | |
| 2006/0150759 A1* | 7/2006 | Gitt | ............................. 74/330 |
| 2006/0169077 A1* | 8/2006 | Gitt | ............................. 74/330 |

FOREIGN PATENT DOCUMENTS

| | | |
|---|---|---|
| DE | 100-37-401 A1 | 2/2002 |
| JP | 56-164265 | 12/1981 |
| JP | 402146335 A * | 6/1990 |

OTHER PUBLICATIONS

European Search Report dated Mar. 31, 2005 for Application No. EP-005-00-2369.

* cited by examiner

*Primary Examiner*—Roger Pang
(74) *Attorney, Agent, or Firm*—Nixon Peabody LLP; Donald R. Studebaker

(57) ABSTRACT

Since the first-speed-ratio counter gear is carried by the first countershaft, the second countershaft carries other counter gears which transmit the relatively small drive torque, such as the forth-speed-ratio counter gear, the second-speed-ratio counter gear and the sixth-speed-ratio counter gear. Thus, there can be provided the twin-clutch transmission with two countershafts disposed coaxially which can surely obtain the advantage of making the transmission for transmitting the sufficiently large drive torque compact.

15 Claims, 8 Drawing Sheets

TWIN-CLUTCH TRANSMISSION

BACKGROUND OF THE INVENTION

The present invention relates to a transmission to transmit a drive power for an automotive vehicle and the like, and particularly a twin-clutch transmission in which two clutch mechanisms are disposed on an input shaft closely to each other.

Conventionally, the twin-clutch transmission with two clutch mechanisms disposed on the input shaft, which performs a prompt shift control by switching the clutch mechanisms in such a manner that when one clutch mechanism is engaged, the other unengaged clutch mechanism performs the shift, is known.

For example, U.S. Pat. No. 4,463,621 discloses this kind of twin-clutch transmission. In the twin-clutch transmission, two countershafts are required in order to provide two drive transmission paths from the input shaft to the output shaft, as disclosed in the above U.S. patent document. However, providing two countershafts separately in the transmission may cause a large-sized apparatus. As a result, there is a problem that the transmission could not be located properly in the tunnel portion of the vehicle floor.

Then, another structure in which the two countershafts are disposed coaxially, as disclosed in U.S. Pat. No. 6,460,425, is considered. Namely, a first countershaft is formed of a cylindrical member and a second countershaft is formed of a shaft member, and these two countershafts are disposed coaxially. This coaxial disposition can provide a compact twin-clutch transmission, solving the above-described problem.

Herein, the transmission is designed so as to bear the drive torque properly for transmitting the drive torque from the drive resource such as an engine to the driven wheels. Thus, the diameter of any shafts is also designed properly. Also, in general, the largest drive torque (hereinafter, referred to as "the maximum transmission torque") is applied to the transmission when the drive torque is transmitted to the wheels via the forward lowermost speed ratio during a vehicle starting. Accordingly, the diameter of the shaft carrying this forward lowermost-speed-ratio gear is required to be designed properly so as to bear this maximum transmission torque.

Namely, in the twin-clutch transmission disclosed in the above-described latter U.S. patent document, the first-speed-ratio counter gear, as the forward lowermost-speed-ratio gear, is carried by the second countershaft which is inserted into the first countershaft. Thus, the diameter of the second countershaft should be large enough to bear the maximum transmission torque.

However, providing such a large shaft of the second countershaft may necessarily cause the large shaft diameter of the first countershaft and the large diameter of the gears carried by the first countershaft. Such a large gear diameter may also require the large distance between shafts to ensure a proper gear ratio, resulting in a large-sized transmission.

Accordingly, the structure of the latter U.S. patent document has a problem that it could not properly obtain an advantage of making the twin-clutch transmission compact by disposing the two countershafts coaxially.

SUMMARY OF THE INVENTION

The present invention has been devised in view of the above-described problems. An object of the present invention is to provide the twin-clutch transmission with two countershafts disposed coaxially which can surely obtain the advantage of making the transmission for transmitting the sufficiently large drive torque compact.

Further, another object of the present invention is to provided the twin-clutch transmission with two countershafts disposed coaxially which can be made compact with a relatively short length.

According to the present invention, there is provided a twin-clutch transmission, comprising an input shaft, an output shaft disposed coaxially with the input shaft, a cylindrical first countershaft disposed in parallel to the output shaft, a second countershaft disposed so as to be inserted into the cylindrical first countershaft, a plurality of gear sets disposed between the output shaft and the first and second countershafts, a first clutch mechanism operative to transmit a drive power to the first countershaft, a second clutch mechanism operative to transmit the drive power to the second countershaft, wherein the first countershaft is supported on a casing of the transmission via a bearing, and a counter gear for a forward lowermost speed ratio among the gear sets is carried by the first countershaft.

Accordingly, since the first countershaft is supported on the casing via the bearing and the forward lowermost-speed-ratio counter gear is carried by the first countershaft, the first countershaft which is securely supported on the casing via the bearing transmits the maximum transmission torque of the forward lowermost speed ratio.

For this reason, since the second countershaft does not transmit the maximum transmission torque of the forward lowermost speed ratio, the shaft diameter of the second countershaft needs not be large enough to bear this maximum transmission torque. Thus, the shaft diameter of the second countershaft can be made smaller.

Also, since the first countershaft transmitting the maximum transmission torque of the forward lowermost speed ratio is securely supported on the casing via the bearing, the support rigidity to properly bear the large drive torque can be ensured.

According to a preferred embodiment, the first countershaft is configured so as to have a shorter shaft than the second countershaft, and the first countershaft is supported at both ends on the casing thereof via the bearing.

Accordingly, since the shaft of the first countershaft is shorter than the second countershaft and this short countershaft is supported at the both ends on the casing, the support rigidity of the first countershaft can be improved without increasing the shaft diameter. Thus, the shaft diameter of the first countershaft can be made small and there can be provided the transmission which transmits the large drive torque.

According to another preferred embodiment, the forward lowermost-speed-ratio counter gear is disposed near the bearing of the first countershaft.

Accordingly, since the forward lowermost-speed-ratio counter gear to which the maximum transmission torque is applied is disposed near the bearing of the first countershaft, the maximum transmission torque is born at the most appropriate portion which can support the first countershaft securely. Thus, the support rigidity of the first countershaft can be improved without increasing the shaft diameter. Therefore, the shaft diameter of the first countershaft can be made smaller.

According to further another preferred embodiment, the plural gear sets comprise at least a gear set for a reverse drive including a counter gear, and the reverse-drive counter gear is carried by the first countershaft.

Accordingly, the reverse-drive counter gear with the large transmission torque like the forward lowermost speed ratio is carried by the first countershaft intensively. For this reason, since the second countershaft does not transmit the drive torque of the reverse drive, the shaft diameter of the second countershaft needs not to be large enough to bear this drive torque of the reverse drive. Thus, the shaft diameter of the second countershaft can be made further smaller. Namely, the twin-clutch transmission can be made further compact.

According to further another preferred embodiment, there are provided a first reduction gear set operative to transmit the drive power from the first clutch mechanism to the first countershaft with a speed reduction and a second reduction gear set operative to transmit the drive power from the second clutch mechanism to the second countershaft with a speed reduction, and a speed reduction ratio of the first reduction gear set is configured so as to be greater than that of the second reduction gear set.

Accordingly, since the first countershaft carrying the forward lowermost-speed-ratio counter gear rotates at a relatively low speed and the second countershaft rotates at a relatively high speed, the speed reduction ratio of the forward lowermost speed ratio can be made greater. Thus, there can be provided the transmission whose range of the gear ratio is greater, without increasing the distance between shafts.

According to further another preferred embodiment, the first countershaft includes a projecting portion at an end thereof which extends in a shaft axial direction, a gear carried by the second countershaft includes a recess portion which is formed at a side face thereof, the projecting portion of the first countershaft extends into the recess portion of the second countershaft in such a manner that the projecting portion of the first countershaft is overlapped with the gear on the second countershaft in the shaft axial direction, and the first countershaft is supported on the casing via a first bearing and the gear on the second countershaft is supported on the projecting portion of the first countershaft via a second bearing.

According to this structure, the first countershaft is supported on the casing via the first bearing, whereas the gear on the second countershaft is supported on the projecting portion of the first countershaft via the second bearing, by locating the projecting portion in the recess portion of the second countershaft with the overlap of the projecting portion with the gear in the shaft axial direction. Namely, the second countershaft is supported by utilizing the first countershaft, and the support position is located so as to be overlapped with the gear on the second countershaft in the shaft axial direction.

Thus, since the second bearing for supporting the second countershaft is overlapped with the gear on the second countershaft, no additional support portion will be necessary in the shaft axial direction. Therefore, the shaft length of the countershafts can be shortened.

According to further another preferred embodiment, the first bearing is disposed near the projecting portion of the first countershaft and the second bearing.

Accordingly, since the second bearing also provides the support rigidity of the casing by this close disposition of the first bearing supporting the first countershaft to the second bearing, the support rigidity by the second bearing can be improved.

According to further another preferred embodiment, the plural gear sets comprise at least counter gears for a forward even-number speed ratio, and the counter gears are carried by the second countershaft intensively.

Accordingly, since the counter gears for the forward even-number speed ratio are carried by the second countershaft, the gears to transmit the large drive torque, such as the forward lowermost-speed-ratio (first-speed-ratio) counter gear and reverse-drive counter gear, need not to be carried by the second countershaft. Thus, even if the second countershaft is supported by the first countershaft, the sufficient support rigidity can be ensured. Therefore, this structure can also provide the firm support of the second countershaft.

According to further another preferred embodiment, the second countershaft is supported on the casing at both ends thereof via a third bearing.

Accordingly, since the second countershaft is supported on the casing at its both ends via the third bearing, the support rigidity of the second countershaft can be improved further than being supported by the first countershaft just via the second bearing.

According to further another preferred embodiment, the second countershaft comprises at least a shaft member which is inserted into the cylindrical first countershaft and a gear member which is equipped with a gear tooth at an outer periphery thereof, and a connecting portion of the shaft and gear members is disposed near the second bearing.

Accordingly, since the second countershaft is formed of at least two members of the shaft member and the gear member, the forming of the second countershaft can be facilitated. Also, since the connecting portion to connect the plural members are disposed near the second bearing, any concern of the sticking between the members can be removed properly and the durability of the transmission can be improved thereby.

Other features, aspects and advantages of the present invention will become apparent from the following description which refers to the accompanying drawings.

DETAILED DESCRIPTION OF THE INVENTION

Figure 1:
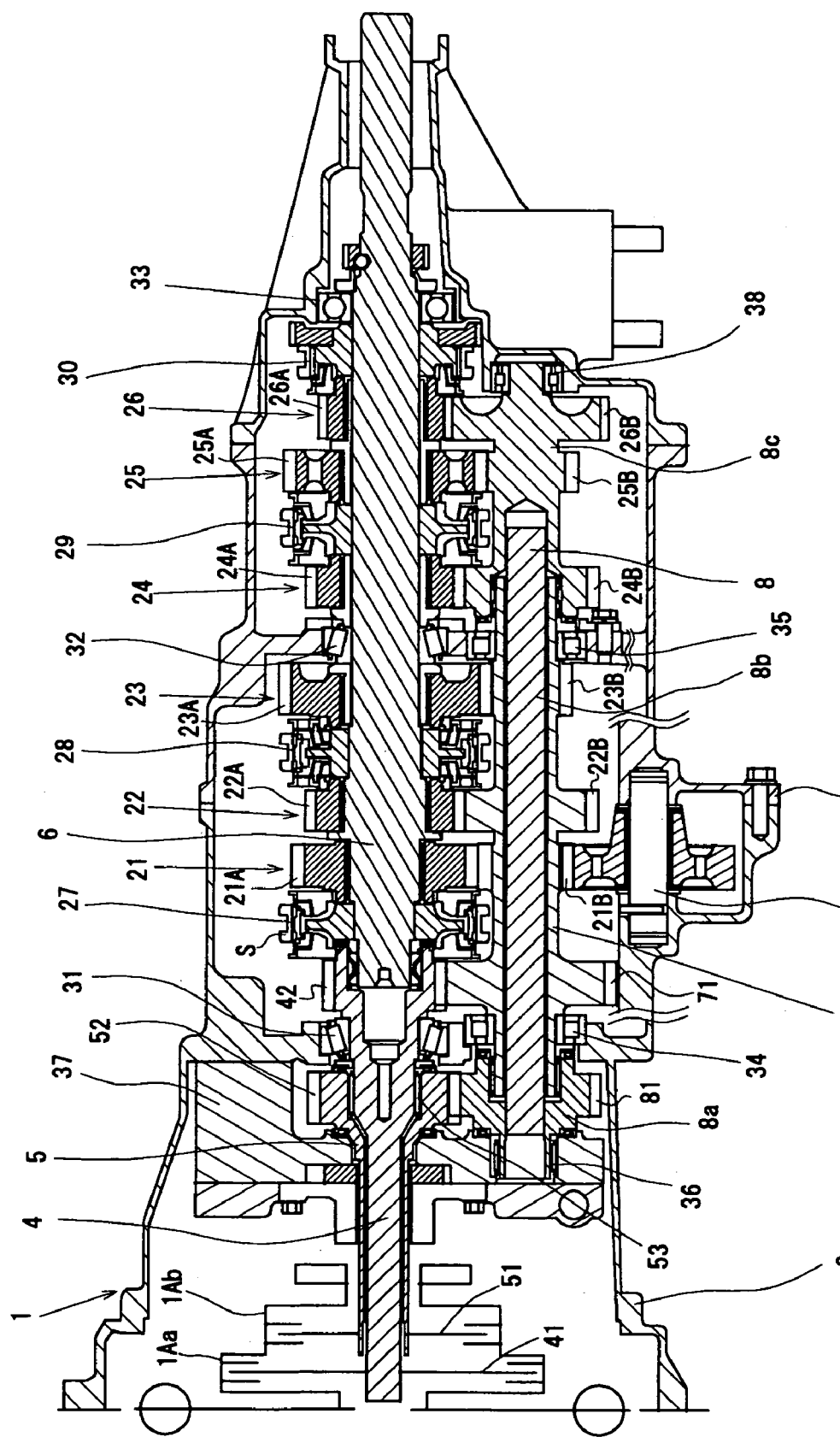
FIG. 1 is a sectional view of an entire twin-clutch transmission according to a first embodiment of the present invention.
Figure 2:
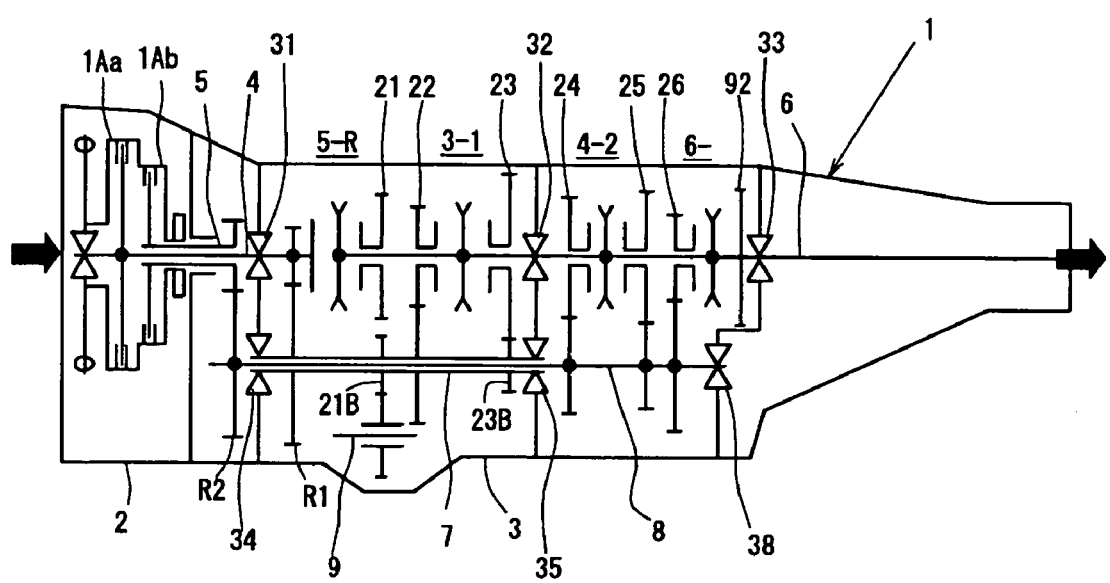
FIG. 2 is a schematic view of the twin-clutch transmission of the first embodiment.
Figure 3:
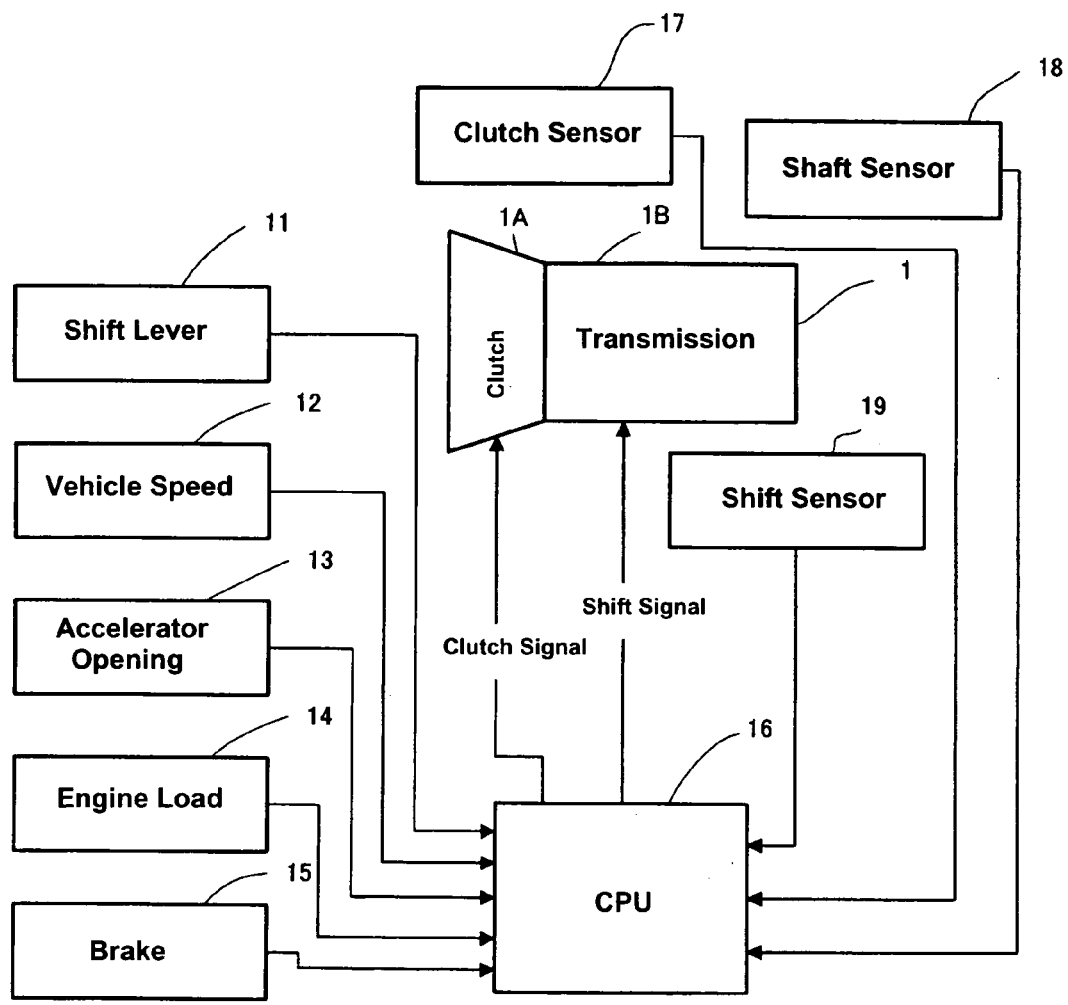
FIG. 3 is a block diagram of a control system.
Figure 4:
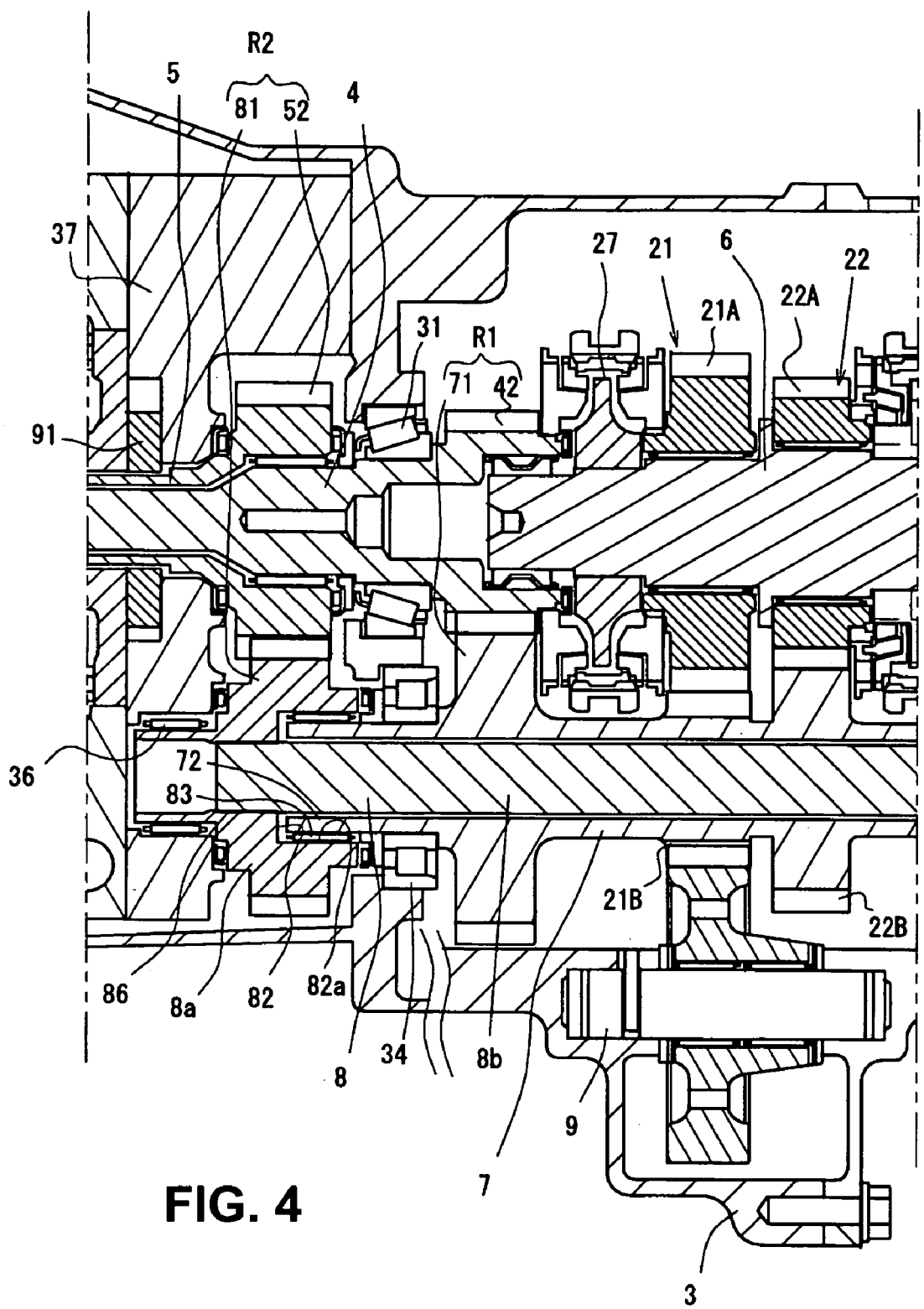
FIG. 4 is a partial enlarged view of a front portion of the twin-clutch transmission.
Figure 5:
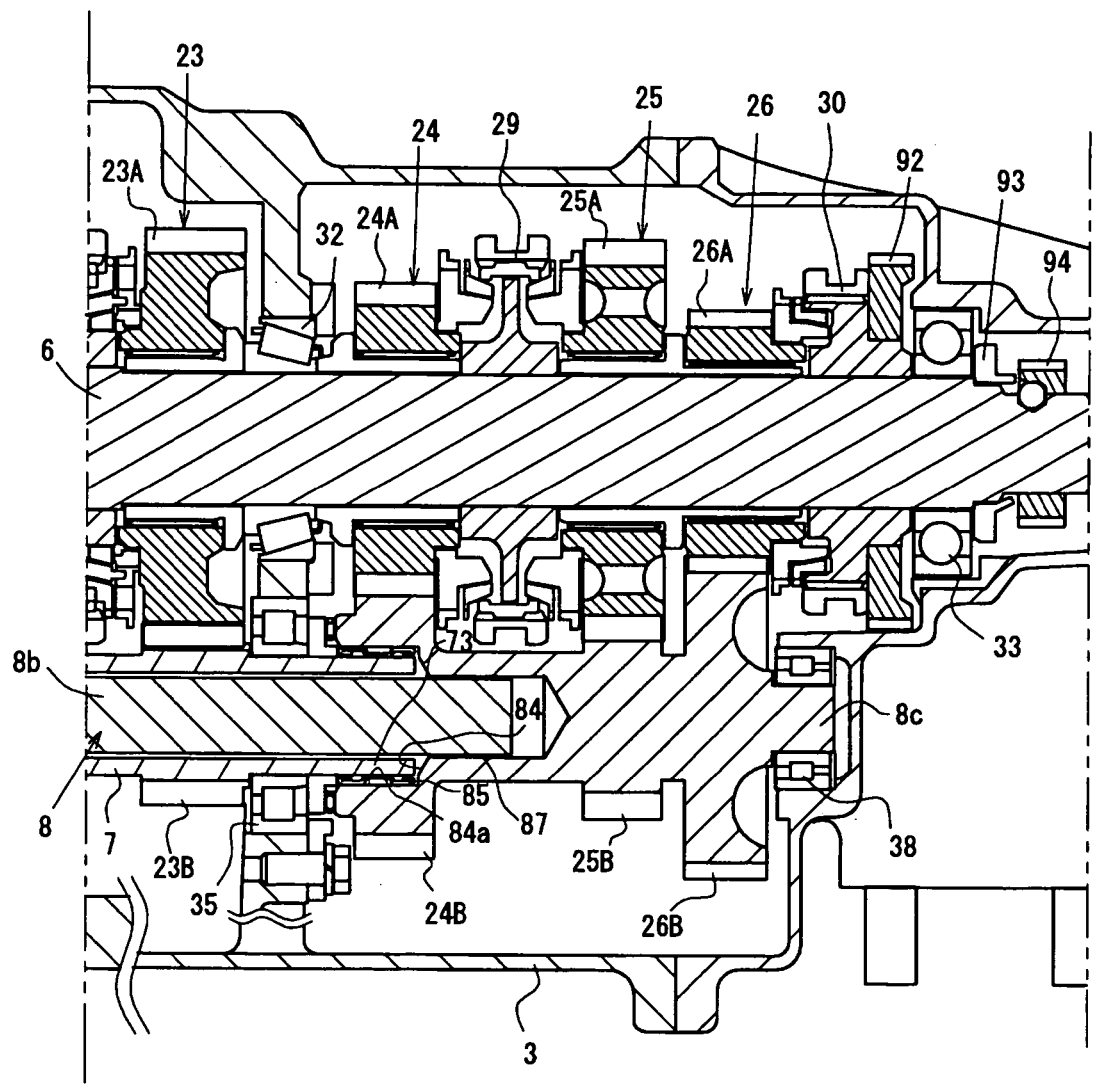
FIG. 5 is a partial enlarged view of a rear portion of the twin-clutch transmission.

Hereinafter, preferred embodiments of the present invention will be described referring to the accompanying drawings. It should be understood that even though embodiments are separately described, single features thereof may be combined to additional embodiments. First, the first embodiment will be described. FIG. 1 is a sectional view of an entire twin-clutch transmission 1 according to the present embodiment. FIG. 2 is a schematic view of the twin-clutch transmission 1 of FIG. 1. FIG. 3 is a block diagram of a control system of the twin-clutch transmission 1. FIG. 4 is a partial enlarged view of a front portion of the twin-clutch transmission 1. FIG. 5 is a partial enlarged view of a rear portion of the twin-clutch transmission 1.

The twin-clutch transmission 1 is configured so as to disposed in a drive transmission path and transmit a rotational drive power from a drive source (not illustrated) such as an engine, which is disposed at the front, to rear driven wheels (not illustrated) with a speed reduction or a speed increase.

The twin-clutch transmission 1 is a so-called automatic transmission which performs an automatic shift control and an automatic clutch control with actuators such as a hydraulic cylinder, and it is controlled by a control system illustrated by the block diagram of FIG. 3.

Namely, this control system is configured such that a shift controller CPU 16 receives signals of a sift lever 11, a vehicle speed 12, an accelerator opening 13, an engine load 14, a brake 15 and so on, and outputs respective control signals to a clutch mechanism 1A and a shift mechanism 1B to control them.

Also, the control system detects a state of the clutch mechanism 1A by a clutch sensor 17, a rotational state of respective shafts by a shaft sensor 18, and a state of a shift rod and the like by a shift sensor 19. Thus, the control system detects the state in the transmission 1 all the time, and conducts a feedback control of the transmission 1.

Generally, the control of the transmission 1 is performed in such a manner that when one clutch mechanism is engaged, the other unengaged clutch mechanism performs a shift, thereby switching the drive transmission path from the one clutch mechanism to the other clutch mechanism. Thus, the shift control can be accomplished promptly by just switching the two clutch mechanisms. Further specific descriptions of this control is omitted here.

Next, an internal structure of the twin-clutch transmission 1 will be described. The transmission 1 comprises, as illustrated in FIGS. 1 and 2, a clutch housing 2 and a gear casing 3. The clutch housing 2 includes a first clutch mechanism 1Aa and a second clutch mechanism 1Ab therein. Meanwhile, the gear casing 3 includes a first input shaft 4 extending longitudinally, a cylindrical second input shaft 5 located surrounding the first input shaft 4, an output shaft 6 disposed behind the first input shaft 4, a cylindrical first countershaft 7 disposed in parallel to the output shaft 6 with a specified distance, a second countershaft 8 located in the cylindrical first countershaft 7, and a reverse idle shaft 9 disposed in parallel to these shafts.

The first input shaft 4, which is formed of a shaft member to which a clutch plate 41 of the first clutch mechanism 1Aa is fixed, transmits the rotational drive power from the drive source to the first countershaft 7 when the first clutch mechanism 1Aa engages.

The first input shaft 4 extends longitudinally from the front of the gear casing 3, and its rear end carries a first input gear 42 to transmit the rotational drive power to the first countershaft 7. Also, there is provided a taper bearing 31 in front of and near the first input gear 42, and the rear end of the first input shaft 4 is supported on the gear casing 3 via the taper bearing 31.

The second input shaft 5, which is formed of a cylindrical member to which a clutch plate 51 of the second clutch mechanism 1Ab is fixed, transmits the rotational drive power from the drive source to the second countershaft 8 when the second clutch mechanism 1Ab engages.

Likewise, the second input shaft 5 extends longitudinally from the front of the gear casing 3, and its rear end carries a second input gear 52 to transmit the rotational drive power to the second countershaft 8. Also, the second input shaft 5 is supported on the first input shaft 4 via a needle bearing 53.

The above-described output shaft 6 is formed of a shaft member which is disposed coaxially with and in rear of the first input shaft 4, and transmits the rotational drive power to the rear driven wheels, receiving directly the drive power from the first countershaft 7, the second countershaft 8 or the first input shaft 4.

The output shaft 6 is disposed so as to extend from the front to the rear in the gear casing 3. Its front end is supported at the rear end of the first input shaft 4, and its central and rear portions are supported on the gear casing 3 via a taper bearing 32 and a ball bearing 33.

The above-described first countershaft 7 is formed of a cylindrical member carrying a first reduction gear 71 at the front thereof which is meshed with the first input gear 42, and transmits the rotational drive power receiving from the first input shaft 4 to the output shaft 6.

The first countershaft 7 is supported on the gear casing 3 at its front and rear ends via roller bearings 34 and 35, respectively. And, it carried a plurality of counter gears.

The above-described second countershaft 8 is formed of three members unlike the first countershaft 7. Namely, it is formed of a first gear member 8a carrying a second reduction gear 81 engaged with the second input gear 52, a second shaft member 8b located coaxially within the cylindrical first countershaft 7, and a third gear member 8c carrying a plurality of counter gears. These members 8a, 8b and 8c are splined to each other so as to rotate integrally and constitute the second countershaft 8.

Since the second countershaft 8 is formed of three members 8a, 8b and 8c, large-sized tools such as a lathe would not necessary in forming gears, thereby improving the productivity. Also, since the forming of gears is conducted for each of members, the forming accuracy can be improved as well.

Herein, although these three members 8a, 8b and 8c constitute the second countershaft 8 in the present embodiment, the first gear member 8a and the second shaft member 8b may be formed of a single member, and this single member and the third gear member 8c may constitute the second countershaft 8. In this case, substantially the same effects may be obtained. Further, the second shaft member 8b and the third gear member 8c may be formed integrally so as to constitute the second countershaft 8 with the first gear member 8a.

The second countershaft 8 also transmits the rotational drive power receiving from the second input shaft 5 to the output shaft 6 as well as the first countershaft 7.

Also, the second countershaft 8 is supported on the case member 37 which is fixed to the gear casing 3 via a needle bearing 36 at its front end in front of the first gear member 8a, and it is supported on the gear casing 3 via a roller bearing 38 at its rear end behind the third gear member 8c.

The above-described reverse idle shaft 9 is formed of a short shaft member and fixed by a pin in a state where its both ends are supported on the gear casing 3.

Next, a plurality of gears and synchronizers, which are respectively carried by the output shaft 6, first counter shaft 7 and second countershaft 8, will be described.

Between the output shaft 6 and the first countershaft 7 or the second countershaft 8 are provided, from the front, gear sets of reverse drive ratio 21, third speed ratio 22, first speed ratio 23, forth speed ratio 24, second speed ratio 25 and sixth speed ratio 6.

All of output gears 21A through 26A of these gear sets which are carried by the output shaft 6 are supported on the output shaft 6 so as to rotate freely. Meanwhile, all of the counter gears 21B through 26B supported on the first countershaft 7 and second countershaft 8 are formed integrally with respective countershafts 7 and 8 so as to rotate together with the countershafts.

Also, synchronizers 27 through 30 are fixed operative to the output shaft 6 by spline connection, and there are respectively provided, from the front, a 5-R synchronizer 27 operative to synchronize the fifth speed ratio and the reverse drive ratio, a 3-1 synchronizer 28 operative to synchronize the third speed ratio and the first speed ratio, a 4-2 synchronizer 29 operative to synchronize the forth speed ratio and the second speed ratio, and a 6 synchronizer 30 operative to synchronize the sixth speed ratio between the respective gear sets 21 through 26.

These synchronizers 27 through 30 connect the respective output gears 21A through 26A with the output shaft 6 by moving sleeves S of the synchronizers (in the shaft axial direction), so that they can rotate together. Since the synchronizing operation of the synchronizer is well known, its specific description is omitted here.

Next, a specific structure of the transmission 1 will be described in FIGS. 4 and 5. As described above, the first input shaft 4 carries the first input gear 42 and the second input shaft 5 carried the second input gear 52. Herein, the diameter of the first input gear 42 is configured so as to be smaller than that of the second input gear 52 as apparent from FIG. 4. Namely, the speed reduction ratio of a first reduction gear set R1 comprising the first input gear 42 and the first reduction gear 71 is configured so as to be greater than that a second reduction gear set R2 comprising the second input gear 52 and the second reduction gear 81.

Thus, since the speed reduction ratio of the first reduction gear set R1 is configured so as to be greater than that the second reduction gear set R2, the rotational speed of the first countershaft 7 can be made lower and the rotational speed of the second countershaft 8 can be made higher. Accordingly, the changing of the reduction ratio of the two countershafts 7 and 8 can provide the low-speed first countershaft 7 and the high-speed second countershaft 8 selectively, so that the range of gear ratio can be made greater properly without increasing the distance between the input and output shafts 4, 6 and the countershafts 7, 8.

Also, between the first reduction gear set R1 and the second reduction gear set R2 are provided respective bearings 31 and 34 to support the shafts 4 through 8 on the gear casing 3. Thus, the disposition of these bearings 31 and 34 can ensure the proper support rigidity effectively for the two drive transmission paths. Accordingly, even if the number of the drive transmission path increases, any additional supports may not be necessary, and the axial length of the transmission 1 can be made short thereby.

Also, the first gear member 8a on the second countershaft 8, which includes a recess portion 82 which is formed at its rear-side inner peripheral portion, is supported on a projecting portion 72 of the first countershaft 7 via a needle bearing 83 at an inner peripheral face 82a of the recess portion 82 thereof. Namely, the first gear member 8a of the second countershaft 8 is supported on the first countershaft 7 and the support position is located so as to overlap with the second reduction gear 81 of the first gear member in the shaft axial direction.

Thus, since the first gear member 8a of the second countershaft 8 is supported on the first countershaft 7 and the support position is located so as to overlap in the shaft axial direction, any additional bearing positions for the supporting two countershafts on the gear casing 3 may not necessary, and the axial length of the transmission 1 can be made short thereby.

Also, the needle bearing 83 is disposed in front of and close to the roller bearing 34 supporting the first countershaft 7 on the gear casing 3. This close disposition of the needle bearing 83 can provide the support rigidity on the gear casing 3 at the needle baring 83 as well, and the support rigidity can be improved thereby.

Further, there is provided a spline connecting portion 86 of the first gear member 8a with the second shaft member 8b just before the needle bearing 83. Accordingly, since the support rigidity for supporting the spline connecting portion 86 is increased, any concern of the sticking between the first gear member 8a and the second shaft member 8b may be removed. Thus, there may not occur any breakages at this portion, and therefore the durability of the transmission 1 can be improved.

Further, the counter gear 21B for reverse drive is carried by the first countershaft 7 in the present embodiment. The first countershaft 7 is the cylindrical shaft with a certain degree of diameter, as described above, and shorter than the second countershaft 8. Further, the first countershaft 7 is supported on the gear casing 3 at its both ends via the roller bearings 34 and 35 (see FIG. 1). Accordingly, the first countershaft 7 can support surely even the reverse-drive counter gear 21B which tends to transmit a relatively large drive torque.

Also, since the support rigidity of the first countershaft 7 itself is high as described above, the second countershaft 8 can also be supported stably via the needle bearing 83.

Also, there is provided an oil pump 91 between the front end portion of the second input shaft 5 and the case member 37. The oil pump 91 generates oil pressure with the rotation of the second input shaft 8 for the hydraulic control and lubrication in the transmission 1.

Also, as illustrated in FIG. 5, the counter gear 23B for first speed ratio is supported on the first countershaft 7 in the present embodiment. The first countershaft 7, as described above, is the short cylindrical member with the certain degree of diameter which is supported at the both ends. Accordingly, the first-speed-ratio counter gear 23B to transmit the largest drive torque can be supported surely by the first countershaft 7.

As described above, the first-speed-ratio counter gear 23B and the reverse-drive counter gear 21B are disposed on the first countershaft 7 intensively. Thus, the second countershaft 8 may carry just other gear sets, such as even-number-speed-ratio counter gears which transmit a relatively small drive torque, specifically the forth-speed-ratio counter gear 24B, second-speed-ratio counter gear 25B and sixth-speed-ratio counter gear 26B.

For this reason, the shaft diameter of the second countershaft 8, specifically the second shaft member 8b, can be set at a relatively small size which would be enough to bear the maximum transmission torque which such gears will transmit.

This small-shaft second shaft member 8b of the second countershaft 8 can also provide a small-sized shaft of the first countershaft 7 located beside the second countershaft 8. Further, the diameter of gears carried by the first countershaft 7 can be smaller as well. Thus, the distance between the both shafts can be made short, resulting in the compact transmission as a whole.

Also, since the counter gears carried by the second countershaft 8 are the even-number-speed-ratio counter gears 24B, 25B and 26B operative to transmit relatively small torque as described above, the second countershaft 8 does not have to bear a large load. Accordingly, the support rigidity of the first countershaft 7 supporting the second countershaft 8 may not deteriorate.

Also, the roller bearing 35 is disposed just behind the first-speed-ratio counter gear 23B to support it on the gear casing 3 directly.

Accordingly, the first countershaft 7 can be supported at a portion thereof on which the torque to be transmitted acts. Thus, the support rigidity of the first countershaft 7 can be ensured surely without increasing the shaft diameter. Also, this means that the shaft diameter of the first countershaft 7 can be made small as much as possible even if it carries the first-speed-ratio counter gear 23B.

Also, the third gear member 8c on the second countershaft 8, which includes a recess portion 84 which is formed at its front-side inner peripheral portion, is supported on a projecting portion 73 of the first countershaft 7 via a bearing bush 85 at an inner peripheral face 84a of the recess portion 84 thereof. Namely, the first gear member 8c of the second countershaft 8 is supported on the first countershaft 7 and the support position is located so as to overlap with the counter gear 24B for forth-speed-ratio of the third gear member in the shaft axial direction.

Thus, like the case of the above-described first gear member 8a, any additional bearing positions for the supporting two countershafts on the gear casing 3 may not be necessary, and the axial length of the transmission 1 can be made short thereby.

Also, the bearing bush 85 is, like the above-described needle bearing 83, disposed in rear of and close to the roller bearing 35 supporting the first countershaft 7 on the gear casing 3. This close disposition of the bearing bush 85 can provide the support rigidity on the gear casing 3 at the bearing bush 85 as well, and the support rigidity can be improved thereby.

Further, there is provided a spline connecting portion 87 of the second shaft member 8b with the third gear member 8c just behind the bearing bush 85. Accordingly, since the support rigidity for supporting the spline connecting portion 87 is increased, any concern of the sticking between the second shaft member 8b and the third gear member 8c may be removed. Thus, there may not occur any breakages at this portion, and therefore the durability of the transmission 1 can be improved.

Herein, a gear which is disposed in rear of the 6 synchronizer 30 is a parking gear 92. The output shaft 6 is locked by engaging a lock gear (not illustrated) with this parking gear 92 when it is required that the rotational drive power is not conveyed to the rear driven wheels.

Also, there is provided a lock nut 93 and a speed meter gear 94 behind the ball bearing 33 supporting the output shaft 6.

Hereinafter, the function and effects of the present embodiment will be described.

As described above, the twin-clutch transmission 1 comprises input shafts 4 and 5, the output shaft 6 disposed coaxially with the input shafts 4 and 5, the cylindrical first countershaft 7 disposed in parallel to the output shaft 6, the second countershaft 8 disposed so as to be inserted into the cylindrical first countershaft 7, the plural gear sets 21 through 26 disposed between the output shaft 6 and the first and second countershafts 7 and 8, the first clutch mechanism 1Aa operative to transmit the drive power to the first countershaft 7, the second clutch mechanism 1Ab operative to transmit the drive power to the second countershaft 8, wherein the first countershaft 7 is supported on the gear casing 3 via the roller bearings 34 and 35, and the first-speed-ratio counter gear 23B among the gear sets 21 through 26 is carried by the first countershaft 7.

Accordingly, since the first countershaft 7 is supported on the gear casing 3 via the bearings 34 and 35 and the first-speed-ratio counter gear 23B is carried by the first countershaft 7, the first countershaft 7 which is securely supported on the gear casing 3 via the roller bearings 34 and 35 transmit the maximum transmission torque of the first speed ratio.

For this reason, since the second countershaft 8 does not transmit the maximum transmission torque of the first speed ratio, the shaft diameter of the second countershaft 8 needs not be large enough to bear this maximum transmission torque. Thus, the shaft diameter of the second countershaft 8 can be made smaller.

Also, since the first countershaft 7 transmitting the maximum transmission torque of the first speed ratio is securely supported on the gear casing 3 via the roller bearings 34 and 35, the support rigidity to properly bear the large drive torque can be ensured.

Thus, there can be provided the compact twin-clutch transmission 1 which is equipped with the two countershafts disposed coaxially and transmits the sufficiently large drive torque.

Also, according to the present embodiment, the first countershaft 7 is configured so as to have the shorter shaft than the second countershaft 8, and the first countershaft 7 is supported at the both ends on the gear casing 3 via the roller bearings 34 and 35.

Thus, since the shaft of the first countershaft 7 is shorter than the second countershaft 8 and this short countershaft is supported at the both ends on the gear casing 3, the support rigidity of the first countershaft 7 can be improved without increasing the shaft diameter. Accordingly, the shaft diameter of the first countershaft 7 can be made small and there can be provided the transmission which transmits the large drive torque.

Also, according to the present embodiment, the first-speed-ratio counter gear 23B is disposed near the roller bearing 35 of the first countershaft 7.

According to this structure, since the first-speed-ratio counter gear 23B to which the maximum transmission torque is applied is disposed near the roller bearing 35 of the first countershaft 7, the maximum transmission torque is born at the most appropriate portion which can support the first countershaft 7 securely. Thus, the support rigidity of the first countershaft 7 can be improved without increasing the shaft diameter. Accordingly, the shaft diameter of the first countershaft 7 can be made smaller.

Also, according to the present embodiment, the reverse-drive counter gear 21B among the plural gear sets 21 through 26 is carried by the first countershaft 7.

According to this structure, the reverse-drive counter gear 21B with the large transmission torque like the first speed gear 23 is carried by the first countershaft 7 intensively. For this reason, since the second countershaft 8 does not transmit the drive torque of the reverse drive gear 21, the shaft diameter of the second countershaft 8 needs not to be large enough to bear this drive torque of the reverse drive gear 21. Thus, the shaft diameter of the second countershaft 8 can be made further smaller. Namely, the twin-clutch transmission 1 can be made further compact.

According to this structure, there are provided the first reduction gear set R1 operative to transmit the drive power from the first clutch mechanism 1Aa to the first countershaft 7 with the speed reduction and the second reduction gear set R2 operative to transmit the drive power from the second clutch mechanism 1Ab to the second countershaft 8 with the speed reduction, and the speed reduction ratio of the first reduction gear set R1 is configured so as to be greater than that of the second reduction gear set R2.

According to this structure, since the first countershaft 7 carrying the first-speed-ratio counter gear 23B rotates at a relatively low speed and the second countershaft 8 rotates at a relatively high speed, the speed reduction ratio of the first speed gear 23 can be made greater. Thus, there can be provided the transmission whose range of the gear ratio is greater, without increasing the distance between shafts.

Further, the first countershaft 7 includes the projecting portions 72 and 73 at its ends which extend in the shaft axial direction, the second reduction gear 81 and the forth-speed-ratio counter gear 24B carried by the second countershaft 8 include the respective recess portions 82 and 84 which are formed at their side faces, the projecting portions 72 and 73 of the first countershaft 7 extend into the above-described recess portions 82 and 84 of the second countershaft 8 respectively in such a manner that the projecting portions 72 and 73 are overlapped with the respective gears 81 and 24B in the shaft axial direction, and the first countershaft 7 is supported on the gear casing 3 via the roller bearings 34 and 35 and the gears 81 and 24B on the second countershaft 8 are supported on the projecting portions 72 and 73 of the first countershaft 7 via the needle bearing 83 and the bearing bush 85.

According to this structure, the first countershaft 7 is supported on the gear casing 3 via the roller bearings 34 and 35, whereas the gears 81 and 24B on the second countershaft 8 are supported on the projecting portions 72 and 73 of the first countershaft 7 via the needle bearing 83 and the bearing bush 85, by locating the projecting portions 72 and 73 in the recess portions 82 and 84 of the second countershaft 8 with the overlap of the projecting portions 72 and 73 with the respective gears 81 and 24B in the shaft axial direction. Namely, the second countershaft 8 is supported by utilizing the first countershaft 7, and the support position is located so as to be overlapped with the gears 81 and 24B on the second countershaft 8 in the shaft axial direction.

Thus, since the needle bearing 83 and bearing bush 85 for supporting the second countershaft 8 are overlapped with the gears 81 and 24B on the second countershaft 8, no additional support portion will be necessary in the shaft axial direction. Therefore, the shaft length of the countershafts 7 and 8 can be shortened.

Accordingly, there can be provided the compact twin-clutch transmission 1 which is equipped with the two countershafts disposed coaxially and compact with its relatively short length even if the number of bearings disposed coaxially is increased.

Also, according to the present embodiment, the roller bearings 34 and 35 are disposed near the projecting portions 72 and 73 of the first countershaft 7 and the needle baring 83 and the bearing bush 85.

According to this structure, since the needle bearing 83 and the bearing bush 85 also provide the support rigidity of the gear casing 3 by this close disposition of the roller bearings 34 and 35 supporting the first countershaft 7 to the needle bearing 83 and bearing bush 85, the support rigidity by the needle bearing 83 and bearing bush 85 can be improved.

Also, according to the present embodiment, the plural gear sets comprises at least the counter gears 24B, 25B and 26B for the forward even-number speed ratio, and these counter gears 24B, 25B and 26B are carried by the second countershaft 8 intensively.

According to this structure, since the counter gears 24B, 25B and 26B for the forward even-number speed ratio are carried by the second countershaft 8, the gears to transmit the large drive torque, such as the first-speed-ratio counter gear 23B and reverse-drive counter gear 21B, need not to be carried by the second countershaft 8. Thus, even if the second countershaft 8 is supported by the first countershaft 7, the sufficient support rigidity can be ensured. Therefore, this structure can also provide the firm support of the second countershaft 8.

Also, according to the present embodiment, the second countershaft 8 is supported on the gear casing 3 and the like at its both ends via the needle bearing 36 and roller bearing 38.

According to this structure, since the second countershaft 8 is supported on the gear casing 3 and the like at its both ends via the needle bearing 36 and roller bearing 38, the support rigidity of the second countershaft 8 can be improved further than being supported by the first countershaft 7 just via the needle bearing 83 and bearing bush 85.

Also, according to the present embodiment, the second countershaft 8 comprises at least the second shaft member 8b which is inserted into the cylindrical first countershaft 7 and the first gear member 8a and third gear member 8c which are equipped with the gear tooth at their outer peripheries, and the spline connecting portions 86 and 87 of these shaft and gear members are disposed near the needle bearing 83 and bearing bush 85.

According to this structure, since the second countershaft 8 is formed of at least two members of the second shaft member 8b and the first gear member 8a or the third gear member 8c, the forming of the second countershaft 8 can be facilitated. Also, since the spline connecting portions 86 and 87 to connect the plural members are disposed near the needle bearing 83 and bearing bush 85, any concern of the sticking between the members can be removed and the durability of the transmission 1 can be improved thereby.

Figure 6:
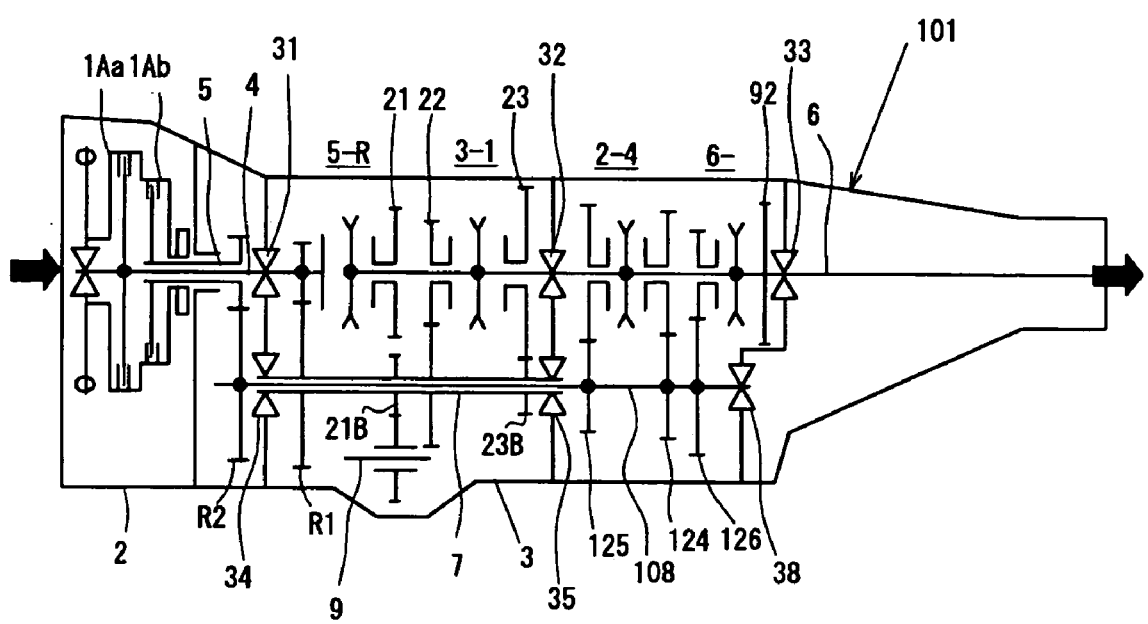
FIG. 6 is a schematic view of a twin-clutch transmission of the second embodiment.
Figure 7:
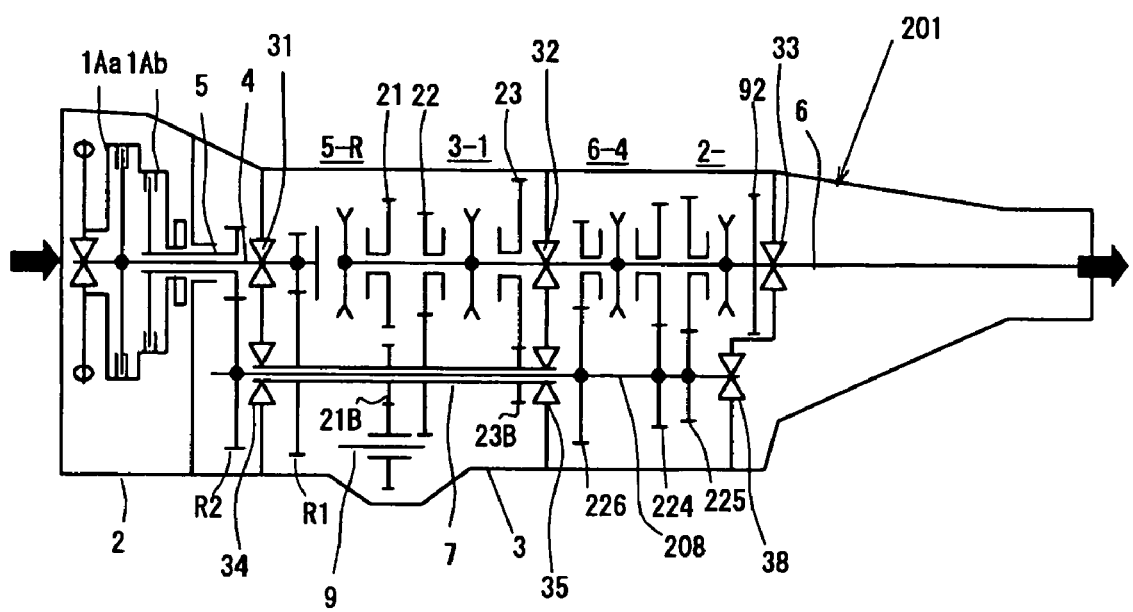
FIG. 7 is a schematic view of a twin-clutch transmission of the third embodiment.
Figure 8:
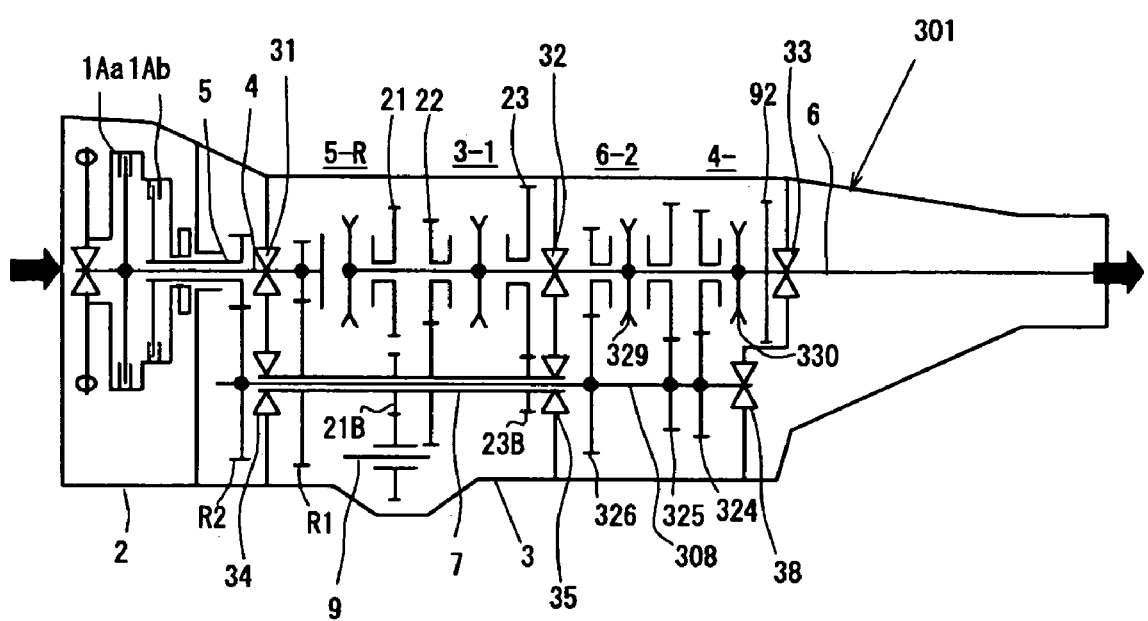
FIG. 8 is a schematic view of a twin-clutch transmission of the forth embodiment.

Next, an internal structure of the twin-clutch transmission according to other preferred embodiments will be described referring to FIGS. 6 through 8. FIG. 6 is a schematic view of a twin-clutch transmission of the second embodiment. FIG. 7 is a schematic view of a twin-clutch transmission of the third embodiment. FIG. 8 is a schematic view of a twin-clutch transmission of the forth embodiment.

Herein, the same parts/elements as the above-described first embodiment are denoted by the same reference numerals, omitting detailed descriptions on those.

First, the second embodiment will be described referring to FIG. 6. In the present embodiment, there are provided, from the front, gear sets of a second speed ratio 125, a forth speed ratio 124 and a sixth speed ratio 126 on a second countershaft 108.

In this case where the second-speed-ratio gear set 125 is disposed at the central portion of the second countershaft 108, the gear set which transmits the second largest drive torque following the first-speed-ratio gear set 23 is disposed near the roller bearing 35 supporting the first countershaft 7. Accordingly, the support rigidity of the second countershaft 108 can be ensured without increasing the shaft diameter.

Thus, this embodiment can also provide the compact transmission. Other function and effects of the present embodiment are the same as the first embodiment.

Next, the third embodiment will be described referring to FIG. 7. In the present embodiment, there are provided, from the front, gear sets of a sixth speed ratio 226, a forth speed ratio 224 and a second speed ratio 225 on a second countershaft 208.

In this case where the sixth-speed-ratio gear set 226 is disposed at the central portion of the second countershaft 108, there can be provided the larger recess portion which is formed at a side face of the third gear member 8c for receiving the projecting portion 73 of the second countershaft 8 like the first embodiment. Thus, the flexibility in designing can be improved.

Also, since the second-speed-ratio gear set 225 is disposed at the rear end of the second countershaft 208 and near the roller bearing 38, the support rigidity of the second countershaft 208 can be ensured without increasing the shaft diameter. Thus, this embodiment can also provide the compact transmission, and the flexibility in designing can be improved as well. Other function and effects of the present embodiment are the same as the first embodiment as well.

Finally, the forth embodiment will be described referring to FIG. 8. In the present embodiment, there are provided, from the front, gear sets of a sixth speed ratio 326, a second speed ratio 325 and a forth speed ratio 324 on a third countershaft 308.

In this case, a 6-2 synchronizer 329 and a 4 synchronizer 330 are provided separately. Accordingly, since the synchronizers 329 and 330 may be operated to shift concurrently, the prompt sift change, for example, from the fourth speed ratio to the second speed ratio skipping the third speed ratio, can be attained. Thus, this embodiment can provide the transmission which enable the prompt and skipping sift change. Other function and effects of the present embodiment are the same as the first embodiment as well.

Respective elements defined as the present invention correspond to members or parts of the transmissions in the above-described embodiments as follows. Namely, the input shaft corresponds to the first and second input shafts 4 and 5; the casing corresponds to the gear casing 3; the forward lowermost-speed-ratio counter gear corresponds to the first-speed-ratio counter gear 23B; the first bearing corresponds to the roller bearings 34 and 35; the projecting portion of the first countershaft corresponds to the projecting portions 72 and 73; the gear carried by the second countershaft corresponds to the second reduction gear 81 and forth-speed-ratio counter gear 24B; the second bearing corresponds to the needle bearing 83 and bearing bush 85. However, the present invention should not be limited to the above-described embodiments, but any other modifications and improvements may be applied within the scope of a sprit of the present invention.

What is claimed is:

1. A twin-clutch transmission, comprising:
an input shaft;
an output shaft disposed coaxially with said input shaft;
a cylindrical first countershaft disposed in parallel to said output shaft;
a second countershaft disposed so as to inserted into said cylindrical first countershaft;
a plurality of gear sets disposed between said output shaft and said first and second countershafts;
a first clutch mechanism operative to transmit a drive power to said first countershaft;
a second clutch mechanism operative to transmit the drive power to said second countershaft,
wherein said first countershaft is supported on a casing of the transmission via a bearing, a counter gear for a forward lowermost speed ratio among said gear sets is carried by the first countershaft, said first countershaft includes a projecting portion at an end thereof which extends in a shaft axial direction, a gear carried by said second countershaft includes a recess portion which is formed at a side face thereof, said projecting portion of the first countershaft extends into said recess portion of the second countershaft in such a manner that said projecting portion of the first countershaft is overlapped with said gear on the second countershaft in the shaft axial direction, and said first countershaft is supported on said casing via a first bearing and said gear on the second countershaft is supported on said projecting portion of the first countershaft via a second bearing.

2. The twin-clutch transmission of claim 1, wherein said first countershaft is configured so as to have a shorter shaft than said second countershaft, and said first countershaft is supported at both ends on the casing thereof via the bearing.

3. The twin-clutch transmission of claim 1, wherein said forward lowermost-speed-ratio counter gear is disposed near said bearing of the first countershaft.

4. The twin-clutch transmission of claim 1, wherein said plural gear sets comprises at least a gear set for a reverse drive including a counter gear, and said reverse-drive counter gear is carried by said first countershaft.

5. The twin-clutch transmission of claim 1, wherein there are provided a first reduction gear set operative to transmit the drive power from said first clutch mechanism to said first countershaft with a speed reduction and a second reduction gear set operative to transmit the drive power from said second clutch mechanism to said second countershaft with a speed reduction, and a speed reduction ratio of said first reduction gear set is configured so as to be greater than that of said second reduction gear set.

6. The twin-clutch transmission of claim 1, wherein said first bearing is disposed near said projecting portion of the first countershaft and said second bearing.

7. The twin-clutch transmission of claim 1, wherein said plural gear sets comprises at least counter gears for a forward even-number speed ratio, and said counter gears are carried by said second countershaft intensively.

8. The twin-clutch transmission of claim 1, wherein said second countershaft is supported on said casing at both ends thereof via a third bearing.

9. The twin-clutch transmission of claim 1, wherein said second countershaft comprises at least a shaft member which is inserted into said cylindrical first countershaft and a gear member which is equipped with a gear tooth at an outer periphery thereof, and a connecting portion of the shaft and gear members is disposed near said second bearing.

10. A twin-clutch transmission, comprising:
an input shaft;
an output shaft disposed coaxially with said input shaft;
a cylindrical first countershaft disposed in parallel to said output shaft;
a second countershaft disposed so as to be inserted into said cylindrical first countershaft;
a plurality of gear sets disposed between said output shaft and said first and second countershafts;
a first clutch mechanism operative to transmit a drive power to said first countershaft;
a second clutch mechanism operative to transmit the drive power to said second countershaft, wherein said first countershaft includes a projecting portion at an end thereof which extends in a shaft axial direction, a gear carried by said second countershaft includes a recess portion which is formed at a side face thereof, said projecting portion of the first countershaft extends into said recess portion of the second countershaft in such a manner that said projecting portion of the first countershaft is overlapped with said gear on the second countershaft in the shaft axial direction, and said first countershaft is supported on said casing via a first bearing and said gear on the second countershaft is supported on said projecting portion of the first countershaft via a second bearing.

11. The twin-clutch transmission of claim 10, wherein said first bearing is disposed near said projecting portion of the first countershaft and said second bearing.

12. The twin-clutch transmission of claim 10, wherein said first countershaft is configured so as to have a shorter shaft than said second countershaft, and said first countershaft is supported at both ends on the casing thereof via the bearing.

13. The twin-clutch transmission of claim 10, wherein said plural gear sets comprises at least counter gears for a forward even-number speed ratio, and said counter gears are carried by said second countershaft intensively.

14. The twin-clutch transmission of claim 10, wherein said second countershaft is supported on said casing at both ends thereof via a third bearing.

15. The twin-clutch transmission of claim 10, wherein said second countershaft comprises at least a shaft member which is inserted into said cylindrical first countershaft and a gear member which is equipped with a gear tooth at an outer periphery thereof, and a connecting portion of the shaft and gear members is disposed near said second bearing.

* * * * *